United States Patent

Dittrick

[11] Patent Number: 6,038,809
[45] Date of Patent: Mar. 21, 2000

[54] BODY GRIPPING TRAP SETTING SYSTEM

[76] Inventor: Frank J. Dittrick, Box 543, Big River, Sask, Canada, S0J 0E0

[21] Appl. No.: 09/184,891

[22] Filed: Nov. 3, 1998

Related U.S. Application Data

[63] Continuation-in-part of application No. 08/736,123, Oct. 24, 1996, abandoned.

[51] Int. Cl.⁷ ................................................. A01M 23/28
[52] U.S. Cl. .............................................................. 43/97
[58] Field of Search .......................................... 43/96, 97

[56] References Cited

U.S. PATENT DOCUMENTS

| | | | |
|---|---|---|---|
| 981,887 | 1/1911 | Schofield | 43/97 |
| 1,238,679 | 8/1917 | Jacob | 43/97 |
| 3,462,872 | 8/1969 | Hall | 43/97 |
| 3,800,463 | 4/1974 | Treadwell | 43/97 |
| 4,115,945 | 9/1978 | Hession | 43/97 |
| 4,357,776 | 11/1982 | Knaak | 43/96 |
| 4,429,485 | 2/1984 | Dubray | 43/97 |

Primary Examiner—Kurt Rowan

[57] ABSTRACT

A new body gripping trap setting system for safely enabling a trapper to compress the spring of any size of body gripping trap without exposing a leg or foot to harm. The inventive device includes a base member, an elongated tube with a vertical slot secured to the base member, a shaft slidably positioned within the elongated tube, a handle secured to the end of the shaft opposite of the elongated tube, a top hook secured to the elongated tube which engages an upper ring of a body gripping trap, and bottom hook secured to the shaft projecting through the slot which engages the lower ring of the body gripping trap, wherein the hooks are positioned diametrically opposite the base member.

4 Claims, 3 Drawing Sheets

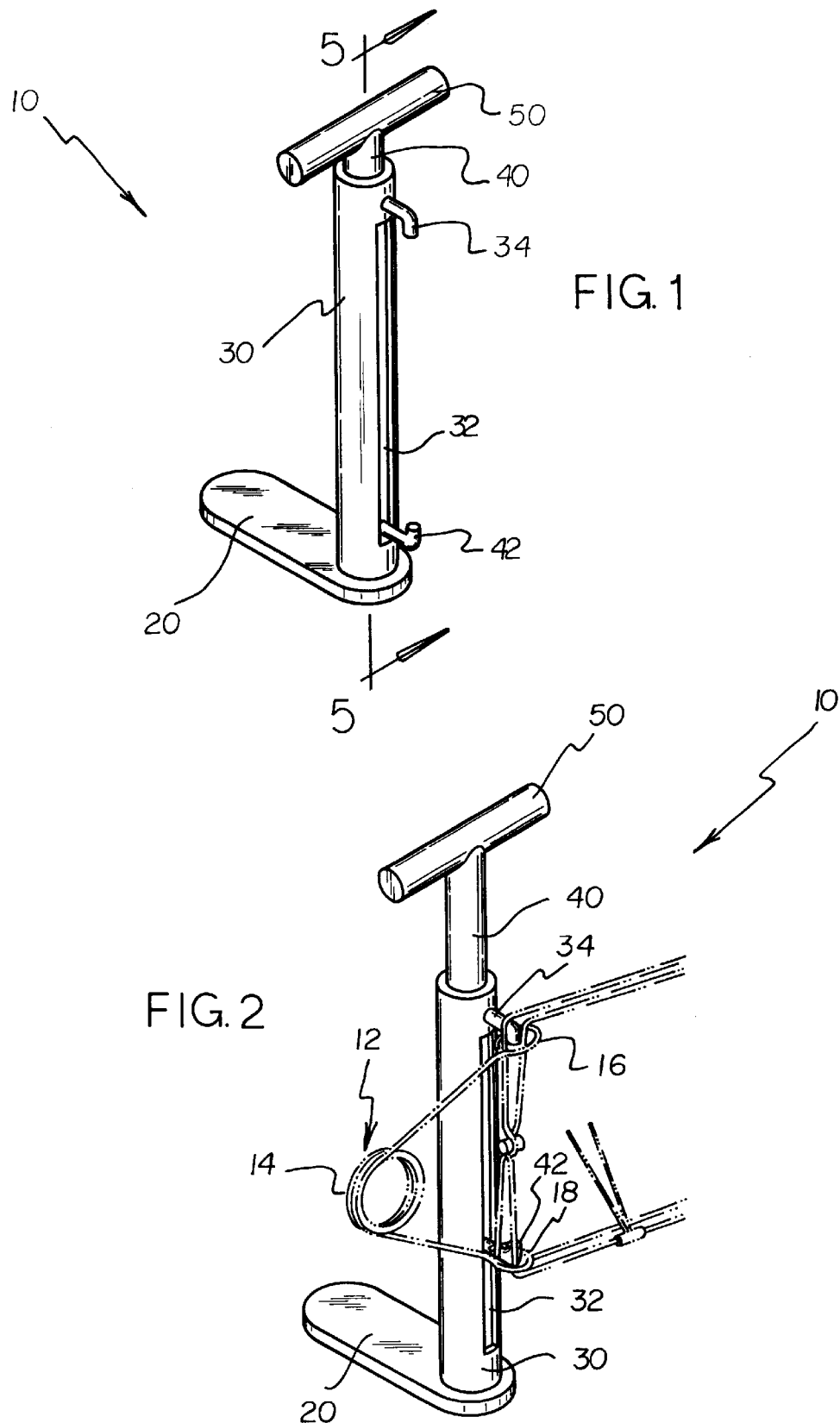

ns309

BODY GRIPPING TRAP SETTING SYSTEM

RELATED APPLICATION

The present application is a continuation-in-part application of a parent application filed Oct. 24, 1996 under Ser. No. 08/736,123 now abandoned.

BACKGROUND OF THE INVENTION

1. Field of the Invention

The present invention relates to trap setting devices and more particularly pertains to a new body gripping trap setting system for safely enabling a trapper to compress the spring of any size of body gripping trap without exposing a leg or foot to harm.

2. Description of the Prior Art

The use of trap setting devices is known in the prior art. More specifically, trap setting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art trap setting devices include U.S. Pat. No. 4,115,945; U.S. Pat. No. 4,414,773; U.S. Des. Pat. No. 327,310; U.S. Pat. Nos. 4,429,485, 4,245,424, 4,807,389; and 3,800,463 to Treadwell.

U.S. Pat. No. 3,800,463 to Treadwell teaches a trap setter that is configured such that a trap is positioned directly adjacent to the portion of the foot piece of the Treadwell device and therefore the leg and foot of the user abuts the trap when the user places his foot on the foot piece. This relationship of Treadwell places the leg and foot of the wearer in a position exposed to harm if the trap becomes loose from the trap setter during the trap setting operation.

In these respects, the body gripping trap setting system according to the present invention substantially departs from the conventional concepts and designs of the prior art, and in so doing provides an apparatus primarily developed for the purpose of safely enabling a trapper to compress the spring of any size of body gripping trap without exposing a leg or foot to harm.

SUMMARY OF THE INVENTION

In view of the foregoing disadvantages inherent in the known types of trap setting devices now present in the prior art, the present invention provides a new body gripping trap setting system construction wherein the same can be utilized for safely enabling a trapper to compress the spring of any size of body gripping trap without exposing a leg or foot to harm.

The general purpose of the present invention, which will be described subsequently in greater detail, is to provide a new body gripping trap setting system apparatus and method which has many of the advantages of the trap setting devices mentioned heretofore and many novel features that result in a new body gripping trap setting system which is not anticipated, rendered obvious, suggested, or even implied by any of the prior art trap setting devices, either alone or in any combination thereof.

To attain this, the present invention generally comprises a base member, an elongated tube with a vertical slot secured to the base member, a shaft slidably positioned within the elongated tube, a handle secured to the end of the shaft opposite of the elongated tube, a top hook secured to the elongated tube which engages an upper ring of a body gripping trap, and bottom hook secured to the shaft projecting through the slot which engages the lower ring of the body gripping trap, wherein the hooks are positioned diametrically opposite the base member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new body gripping trap setting system apparatus and method which has many of the advantages of the trap setting devices mentioned heretofore and many novel features that result in a new body gripping trap setting system which is not anticipated, rendered obvious, suggested, or even implied by any of the prior art trap setting devices, either alone or in any combination thereof.

It is another object of the present invention to provide a new body gripping trap setting system which may be easily and efficiently manufactured and marketed.

It is a further object of the present invention to provide a new body gripping trap setting system which is of a durable and reliable construction.

An even further object of the present invention is to provide a new body gripping trap setting system which is susceptible of a low cost of manufacture with regard to both materials and labor, and which accordingly is then susceptible of low prices of sale to the consuming public, thereby making such body gripping trap setting system economically available to the buying public.

Still yet another object of the present invention is to provide a new body gripping trap setting system which provides in the apparatuses and methods of the prior art some of the advantages thereof, while simultaneously overcoming some of the disadvantages normally associated therewith.

Still another object of the present invention is to provide a new body gripping trap setting system for safely enabling a trapper to compress the spring of any size of body gripping trap without exposing a leg or foot to harm.

Yet another object of the present invention is to provide a new body gripping trap setting system which includes a base member, an elongated tube with a vertical slot secured to the base member, a shaft slidably positioned within the elongated tube, a handle secured to the end of the shaft opposite of the elongated tube, a top hook secured to the elongated tube which engages an upper ring of a body gripping trap, and bottom hook secured to the shaft projecting through the slot which engages the lower ring of the body gripping trap, wherein the hooks are positioned diametrically opposite the base member.

Still yet another object of the present invention is to provide a new body gripping trap setting system that allows a trapper to set body gripping traps without help from another.

Even still another object of the present invention is to provide a new body gripping trap setting system that eliminates the manual setting of traps and allowing the user to leave his or her gloves on.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an upper side perspective view of a new body gripping trap setting system according to the present invention.

FIG. 2 is an upper side perspective view of the present invention retaining a body gripping trap.

DESCRIPTION OF THE PREFERRED EMBODIMENT

Figure 3:
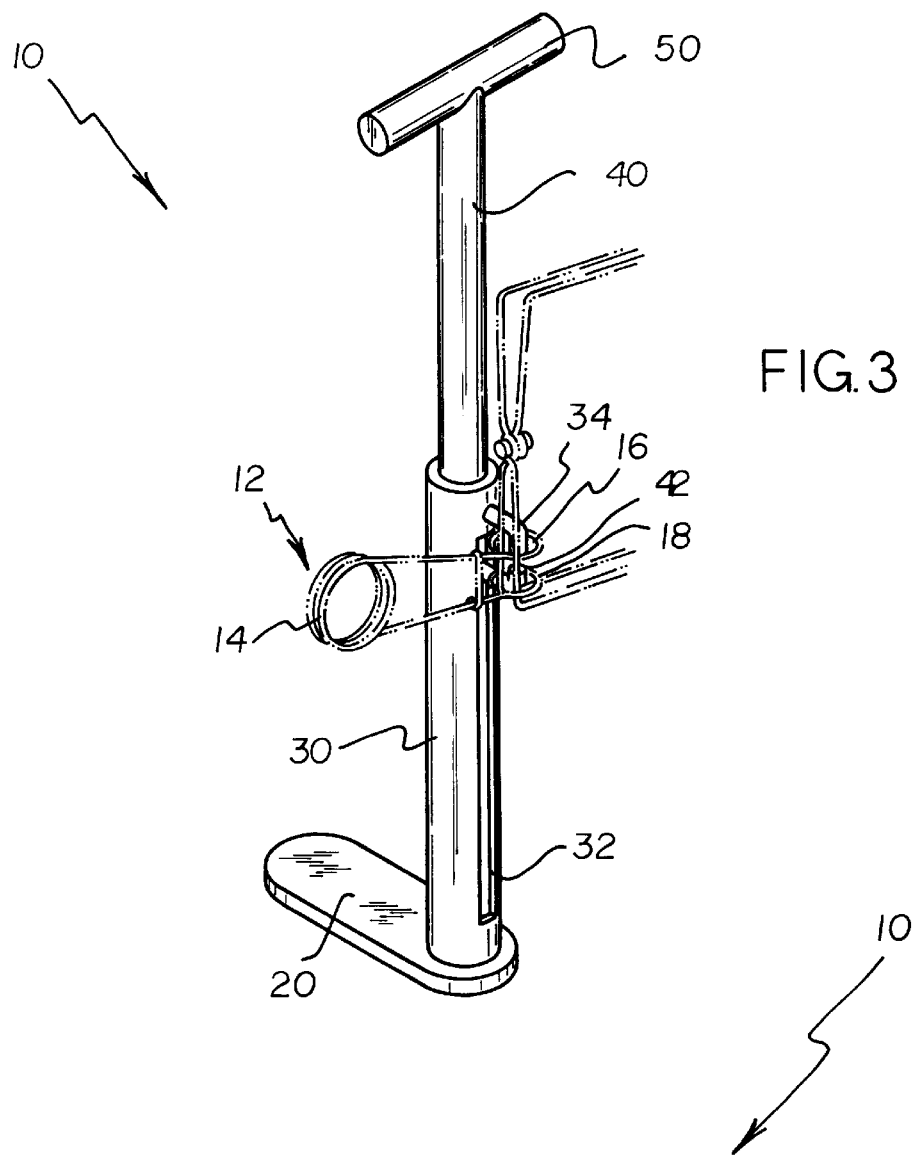
FIG. 3 is an upper side perspective view of the present invention retaining a body gripping trap in the set position.
Figure 4:
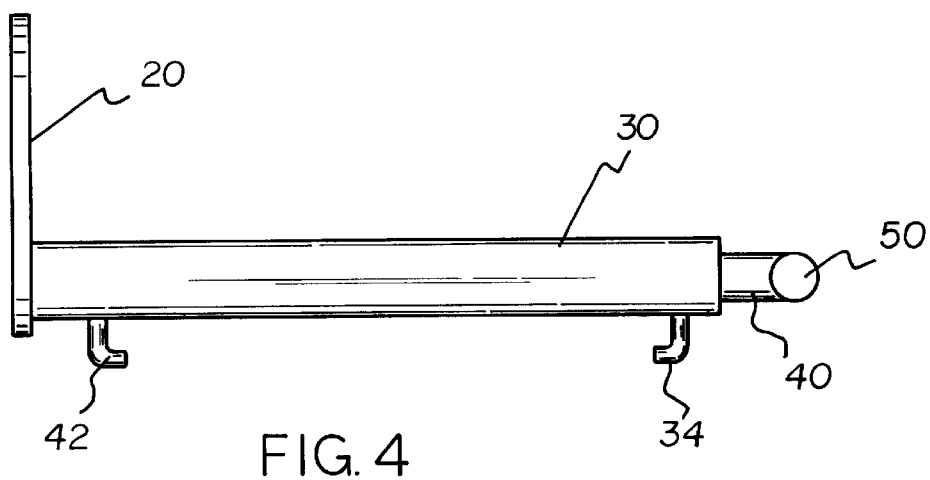
FIG. 4 is a side view of the invention.

With reference now to the drawings, and in particular to FIGS. 1 through 6 thereof, a new body gripping trap setting system embodying the principles and concepts of the present invention and generally designated by the reference numeral 10 will be described.

More specifically, it will be noted that the body gripping trap setting system 10 comprises a base member 20, an elongated tube 30 secured orthogonally at one end to the base member 20, the elongated tube 30 including a vertical slot 32, and an unnumbered spring compressing means slidably projecting within the elongated tube 30 and projecting through the slot 32 to engage an upper ring 16 and a lower ring 18 of a body gripping trap 12 and compress a spring 14 of the body gripping trap 12.

Figure 5:
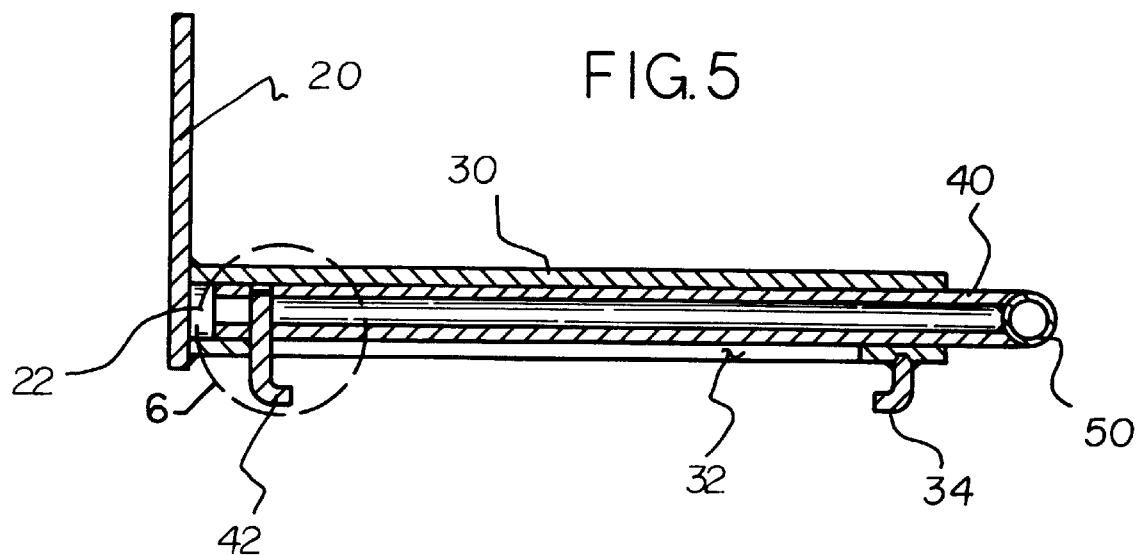
FIG. 5 is a cross sectional view taken along line 5—5 of FIG. 1.
Figure 6:
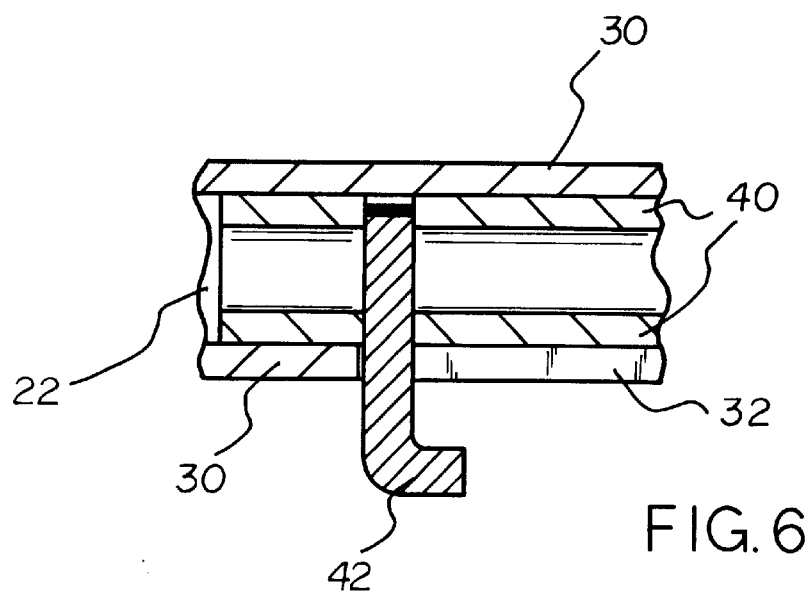
FIG. 6 is a magnified view from FIG. 5 disclosing the bottom hook.

As illustrated in FIGS. 1 through 6, it can be shown that the unnumbered spring compressing means has a hollow shaft 40 slidably projecting within the elongated tube 30. By being hollow, the shaft has a light weight design. A hollow handle 50 is secured to the end of the shaft 40 opposite of the elongated tube 30 as best disclosed in FIGS. 1 through 3 of the drawings. Preferably, the handle has a length slightly less than that of the base member. A top hook 34 is secured orthogonally to the upper portion of the elongated tube 30 which removably engages the upper ring 16 as best disclosed in FIGS. 2 and 3 of the drawings. A lower hook 42 is secured orthogonally to the lower portion of the shaft 40 and slidably projecting through the slot 32 to removably engage the lower ring 18 as shown in FIGS. 5 and 6 of the drawings. Ideally, the lower hook is welded in a pair of diametrically opposed bores formed in the hollow shaft, as shown in FIG. 5. Further, the inboard extents of the hooks are preferably twice the length of the outboard extents thereof.

Pulling upward upon the handle 50 forces the lower ring 18 closer to the upper ring 16 thereby compressing the spring 14. A cylindrical projection 22 is preferably secured to the base member 20 within the elongated tube 30 as shown in FIG. 5 of the drawings. The base member 20 extends radially outward from the elongated tube 30 and is substantially swaged with a pair of parallel side edges as disclosed in FIGS. 1 through 5 of the drawings.

In use, the user inserts the top and bottom hooks 34, 42 into the respective upper and lower rings 16, 18. The user then pulls upward upon the handle 50 which brings the bottom hook 42 engaging the lower ring 18 closer to the top hook 34 engaging the upper ring 16. When the upper and lower rings 16, 18 are at the preferred distance apart, the user then installs a safety hook 19 to prevent further separation of the body gripping trap 12. Thereafter, the user descends the handle 50 allowing the top and bottom hooks 34, 42 to become disengaged from the respective upper and lower rings 16, 18. It is imperative that the handle be maintained in perpendicular relationship with the base member and the hooks face in a direction about 180 degrees with respect to the base member to protect the leg from the body gripping trap if any unintentional slippage occurs during use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A body gripping trap system comprising:

a base member for placement thereon of a foot of a leg of a user for stabilizing said base member, said base member being elongate and having two opposite lengthwise sides and opposite first and second ends, said sides being positioned substantially parallel with respect to each other;

an elongated tube secured orthogonally at said first end of said base member;

said elongated tube including a vertical slot; and a spring compressing means for compressing a spring of a body gripping trap, said spring compression means being slidably moveable in said elongated tube and projecting through said slot to engage an upper ring and a lower ring of said body gripping trap;

wherein said spring compressing means includes a shaft slidably projecting within said elongated tube, said shaft of said spring compressing means being hollow and the lower hook being secured within a pair of diametrically opposed bores formed therein, a handle secured to the end of said shaft opposite of said elongated tube, a top hook secured orthogonally to the upper portion of said elongated tube and projecting through said vertical slot for removably engaging said upper ring of said body gripping trap, and a lower hook secured orthogonally to the lower portion of said shaft and slidably projecting through said vertical slot for removably engaging said lower ring of said body gripping trap such that pulling upward upon said handle forces said lower ring closer to said upper ring to thereby compress said spring; and wherein the vertical slot in said elongated tube is directed toward the first end of said base member and away from the second end of said base member such that said hooks extend in a direction opposite from that in which the base member extends and said elongated tube is positioned between said body gripping trap engaged by said top and lower hooks and the leg and foot of the user to protect the leg from said body gripping trap and any unintentional slippage of said body gripping trap.

2. A body gripping trap system as set forth in claim 1 wherein the opposite lengthwise sides of the base member are parallel to define a substantially uniform shape.

3. A body gripping trap system as set forth in claim 1 wherein the handle is secured to the end of said shaft in perpendicular relationship with the base member.

4. A body gripping trap system as set forth in claim 1 wherein the elongated tube is secured at said first end of said base member via a substantially cylindrical projection coupled to and extending upwardly from the base member.

* * * * *